(12) United States Patent
Wittmeyer, Jr. et al.

(10) Patent No.: US 12,154,461 B2
(45) Date of Patent: Nov. 26, 2024

(54) LINERLESS RECEIPTS AND LABELS

(71) Applicants: Larry E. Wittmeyer, Jr., Lake Lotawana, MO (US); Alexander Yambao, Las Vegas, NV (US)

(72) Inventors: Larry E. Wittmeyer, Jr., Lake Lotawana, MO (US); Alexander Yambao, Las Vegas, NV (US)

( * ) Notice: Subject to any disclaimer, the term of this patent is extended or adjusted under 35 U.S.C. 154(b) by 650 days.

(21) Appl. No.: 17/241,349

(22) Filed: Apr. 27, 2021

(65) Prior Publication Data

US 2022/0301459 A1     Sep. 22, 2022

Related U.S. Application Data

(63) Continuation-in-part of application No. 17/205,207, filed on Mar. 18, 2021.

(51) Int. Cl.
| | |
|---|---|
| *G09F 3/02* | (2006.01) |
| *B65C 1/02* | (2006.01) |
| *B65C 9/00* | (2006.01) |
| *B65D 5/02* | (2006.01) |
| *B65D 5/42* | (2006.01) |
| *C09J 7/21* | (2018.01) |
| *C09J 7/38* | (2018.01) |
| *C09J 7/50* | (2018.01) |
| *C09J 105/00* | (2006.01) |
| *C09J 129/04* | (2006.01) |

(52) U.S. Cl.
CPC ............... *G09F 3/02* (2013.01); *B65C 1/02* (2013.01); *B65C 9/0015* (2013.01); *B65D 5/0236* (2013.01); *B65D 5/4233* (2013.01); *C09J 7/21* (2018.01); *C09J 7/385* (2018.01); *C09J 7/50* (2018.01); *C09J 105/00* (2013.01); *C09J 129/04* (2013.01); *C09J 2400/10* (2013.01); *C09J 2400/283* (2013.01); *C09J 2405/00* (2013.01); *C09J 2429/00* (2013.01); *C09J 2433/00* (2013.01); *G09F 2003/0208* (2013.01); *G09F 2003/0239* (2013.01); *G09F 2003/025* (2013.01); *G09F 2003/0272* (2013.01); *G09F 2003/0283* (2013.01)

(58) Field of Classification Search
CPC .............. G09F 3/02; G09F 2003/0208; G09F 2003/0239; G09F 2003/025; G09F 2003/0272; G09F 2003/0283; C09J 7/385; C09J 7/21; C09J 7/50; C09J 129/04; C09J 105/00; C09J 2429/00; C09J 2433/00; C09J 2405/00; C09J 2400/10; C09J 2400/283; B65C 1/02; B65C 9/0015; B65D 5/0236; B65D 5/4233
USPC .......................................................... 40/312
See application file for complete search history.

(56) References Cited

U.S. PATENT DOCUMENTS

| | | | |
|---|---|---|---|
| 8,716,389 B2 * | 5/2014 | Lux .............................. | C09J 7/38 524/500 |
| 11,151,907 B2 | 10/2021 | Jeske | |
| 2010/0300613 A1 * | 12/2010 | Stogbauer .................. | C09J 7/35 428/41.3 |

* cited by examiner

*Primary Examiner* — Hui H Chin

(57) ABSTRACT

A labeling system for use with containers, comprising at least one linerless label, wherein the at least one linerless label is adapted to receive printing thereon; a substrate for receiving the label and to which the label becomes permanently bound after the label has been attached to the substrate; a first adhesive, wherein the first adhesive is a repositionable adhesive; a second adhesive, wherein the second adhesive is a remoistenable adhesive that includes predetermined amounts of polyvinyl alcohol, dextrin, and at least one humectant, and wherein the adhesives are deposited on the label prior to attaching the label to the substrate.

7 Claims, 9 Drawing Sheets

LINERLESS RECEIPTS AND LABELS

This patent application is a continuation-in-part of U.S. patent application Ser. No. 17/205,207 filed on Mar. 18, 2021 and entitled "Linerless Labels and Receipts", the disclosure of which is hereby incorporated by reference herein in its entirety and made part of the present U.S. utility patent application for all purposes.

BACKGROUND

The disclosed inventive subject matter relates in general to printed receipts and labels for use with various types of packaging, and more specifically to systems and methods for manufacturing printable receipts and labels that do not include a liner, are dry until moistened, and that cannot be removed from a bag or box to which they are attached without damaging or destroying the printed receipt or label.

Receipts and labels used for commercial purposes are typically constructed as multilayered materials that often include a face stock component; an adhesive component; a release coating component; and a release liner component. The face stock is the surface material of the receipt or label and may be paper, foil, film or cloth-material that is designed to be printed upon and converted into pressure sensitive stock. The adhesive is designed as a coating layer to adhere to a wide variety of surfaces and may be either permanent or removable for long or short-term use. The release coating is a unique coating applied to a liner that regulates a correct adhesion release. The release level is a measure of the peel strength from a release liner. The release liner protects the adhesive from contamination and is removed for application of the label.

Commercial labels that are intended to be permanent often use a pressure-sensitive adhesive and include a liner component, which makes the label expensive to manufacture and non-recyclable due to the non-recyclable material used in the liner. Repositionable labels that do not include a liner do not adhere well to recyclable containers and untreated plastic. Furthermore, the adhesives used with such labels are not considered safe for human consumption if the adhesives come into contact with food or other consumables stored in the containers on which such labels have been placed. Accordingly, there is an ongoing need for a low-cost, linerless, permanent label or receipt that can be used on various boxes, bags, and other containers that includes a food grade adhesive that accepted by regulatory authorities such as the U.S. Food and Drug Administration (FDA).

SUMMARY

The following provides a summary of certain example implementations of the disclosed inventive subject matter. This summary is not an extensive overview and is not intended to identify key or critical aspects or elements of the disclosed inventive subject matter or to delineate its scope. However, it is to be understood that the use of indefinite articles in the language used to describe and claim the disclosed inventive subject matter is not intended in any way to limit the described inventive subject matter. Rather the use of "a" or "an" should be interpreted to mean "at least one" or "one or more".

One implementation provides a first labeling system for use with containers, comprising at least one linerless label, wherein the at least one linerless label is adapted to receive printing thereon; a substrate for receiving the label and to which the label becomes permanently bound after the label has been attached to the substrate; a first adhesive, wherein the first adhesive is a repositionable adhesive; a second adhesive, wherein the second adhesive is a remoistenable adhesive that includes predetermined amounts of polyvinyl alcohol, dextrin, and at least one humectant, and wherein the adhesives are deposited on the label prior to attaching the label to the substrate. The at least one linerless label may include thermal paper or standard paper. The at least one linerless label may be adapted for use as a receipt. The receipt may be adapted to seal a package to which it is attached in a tamper-proof manner by creating a closure that can only be removed by damaging or destroying the package, the receipt, or both the package and the receipt. The second adhesive may be a food grade material. The at least one humectant may be glycerin, propylene glycol, or a combination thereof. The substrate may be a bag, box, or other container used for storing and transporting food and other items. The label may be adapted to be attached to the substrate either manually or in an automated manner.

Another implementation provides a second labeling system for use with containers, comprising at least one linerless label, wherein the at least one linerless label is adapted to receive printing thereon; a substrate for receiving the label and to which the label becomes permanently bound after the label has been attached to the substrate; a first adhesive, wherein the first adhesive is a repositionable adhesive, and wherein the first adhesive is deposited on the label prior to attaching the label to the substrate; a second adhesive, wherein the second adhesive is either substantially dry or tacky prior to being activated and moist or wet after being activated, and wherein the second adhesive is deposited on the label prior to attaching the label to the substrate; and an activator for activating the second adhesive and controlling the rate of drying thereof. The at least one linerless label may include thermal paper or standard paper. The at least one linerless label may be adapted for use as a receipt. The receipt is adapted to seal a package to which it is attached in a tamper-proof manner by creating a closure that can only be removed by damaging or destroying the package, the receipt, or both the package and the receipt. The second adhesive may contain predetermined amount of polyvinyl alcohol. The second adhesive may contain a predetermined amount of dextrin. The second adhesive may contain a predetermined amount of a humectant and the humectant may include glycerin, propylene glycol, or a combination thereof. The second adhesive may contain a predetermined amount of primer, and the primer may include silica. The second adhesive may be an acrylic pressure-sensitive adhesive. The second adhesive may be a food grade material. The activator may include water, water with a predetermined amount of glycerin, water with a predetermined amount of propylene glycol, or water with a predetermined amount of a predetermined alcohol. The substrate may be a bag, box, or other container used for storing and transporting food and other items. The label may be adapted to be attached to the substrate either manually or in an automated manner.

Still another implementation provides a third labeling system for use with containers, comprising at least one linerless label, wherein the at least one linerless label is adapted to receive printing thereon, and wherein the at least one linerless label includes thermal paper or standard paper; a substrate for receiving the label and to which the label becomes permanently bound after the label has been attached to the substrate, wherein the substrate is a bag, box, or other container used for storing and transporting food and other items, and wherein the label is adapted to be attached to the substrate either manually or in an automated manner;

a first adhesive, wherein the first adhesive is a repositionable adhesive, and wherein the first adhesive is deposited on the label prior to attaching the label to the substrate; a second adhesive, wherein the second adhesive is either substantially dry or tacky prior to being activated and moist or wet after being activated, wherein the at least one adhesive includes a predetermined amount of polyvinyl alcohol, wherein the second adhesive is a food grade material, and wherein the second adhesive is deposited on the label prior to attaching the label to the substrate; and an activator for activating the adhesive and controlling the rate of drying thereof, wherein the activator includes water, water with a predetermined amount of glycerin, water with a predetermined amount of propylene glycol, or water with a predetermined amount of a predetermined alcohol. The at least one linerless label may be adapted for use as a receipt. The receipt may be applied to the substrate at a point of purchase. The receipt may be adapted to seal a package to which it is attached in a tamper-proof manner by creating a closure that can only be removed by damaging or destroying the package, the receipt, or both the package and the receipt. The second adhesive may contain a predetermined amount of dextrin. The second adhesive may contain a predetermined amount of a humectant and the humectant may include glycerin, propylene glycol, or a combination thereof. The second adhesive may contain a predetermined amount of primer, and the primer may include silica.

It should be appreciated that all combinations of the foregoing concepts and additional concepts discussed in greater detail below (provided such concepts are not mutually inconsistent) are contemplated as being part of the inventive subject matter disclosed herein and may be implemented to achieve the benefits as described herein. Additional features and aspects of the disclosed system, devices, and methods will become apparent to those of ordinary skill in the art upon reading and understanding the following detailed description of the example implementations. As will be appreciated by the skilled artisan, further implementations are possible without departing from the scope and spirit of what is disclosed herein. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more example implementations of the disclosed inventive subject matter and, together with the general description given above and detailed description given below, serve to explain the principles of the disclosed subject matter, and wherein.

DETAILED DESCRIPTION

Figure 1:
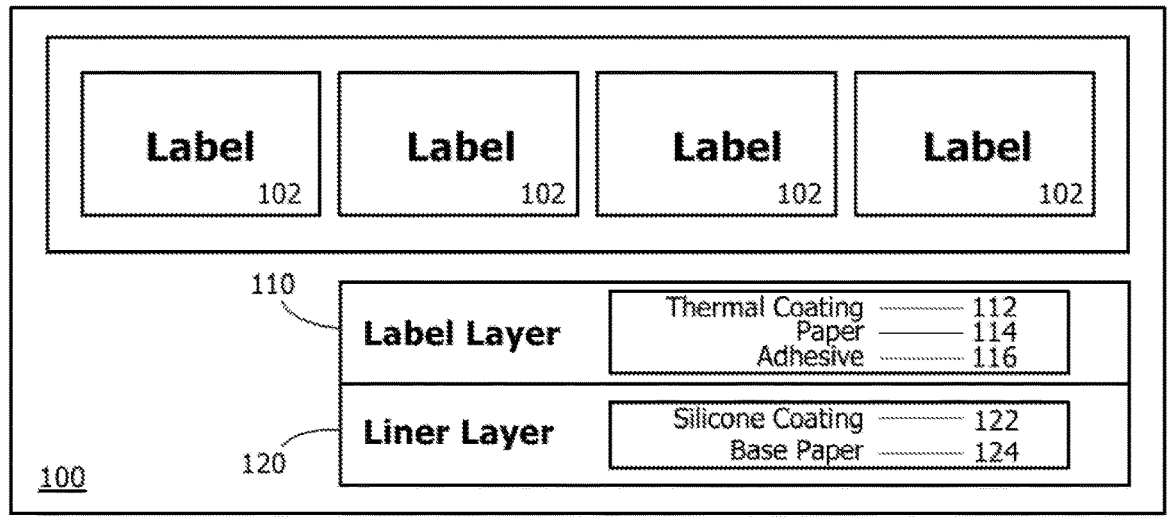
FIG. 1 depicts the construction of a prior art label.

Example implementations are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the disclosed inventive subject matter. Accordingly, the following implementations are set forth without any loss of generality to, and without imposing limitations upon, the claimed subject matter.

The disclosed system, devices, and methods provide receipts and labels that may be used for commercial purposes and in various business environments. These receipts and labels are designed to be permanently attached to the containers with which they are used and do not include liners or repositionable adhesives. The adhesives used with the disclosed receipts and labels is typically dry to tacky until moisture is applied either to the label itself or to the container to which the receipts or label is to be attached. TABLE 1, below, lists an example prior art adhesive system as well as three examples of adhesive systems compatible with the disclosed systems, devices, and methods. TABLE 2, below, lists examples of the construction of prior art receipts and labels and examples of receipts and labels constructed in accordance with the disclosed systems, devices, and methods.

As shown in TABLE 1, implementations of the disclosed technology include labels and receipts that are printed on either uncoated paper or thermal paper. The adhesive formulations may include polyvinyl alcohol, which allows the adhesive to dry quickly or more slowly when mixed with agents such as glycerin and propylene glycol. When initially applied to the label or to the substrate onto which the label will be attached, the adhesive may have either a "dry tack" stickiness or consistency or a wet consistency if activated with water mixed with glycerin, propylene glycol, or similar materials. In all examples, the disclosed adhesives form a permanent bond with the substrates to which they are attached and cannot be removed without destroying the substrate or the label. Additionally, all disclosed adhesives, unlike prior art adhesives used for similar purposes, are food grade materials that are considered safe for human contact and even human consumption if they come into contact with food or other consumable items.

As shown in TABLE 2, an example of the receipts disclosed herein includes six different layers that include a release coating, a thermal coating, a print receptive coating, paper or plastic, a primer, and a remoistenable, permanent adhesive. An example of the labels disclosed herein includes five different layers that include a release coating, a thermal coating, paper or plastic, a primer, and a remoistenable, permanent adhesive. Other variants are possible.

TABLE 1

Example Adhesive Systems.

|  | PRIOR ART Repositionable Adhesive | SYSTEM 1 Remoistenable Adhesive | SYSTEM 2 Permanent Adhesive | SYSTEM 3 Wet Applied Remoistenable Adhesive |
|---|---|---|---|---|
| Substrate (Face Stock) | uncoated paper thermal paper coated with dye | uncoated paper thermal paper coated with dye | uncoated paper thermal paper coated with dye | uncoated paper thermal paper coated with dye |
| Adhesive | acrylic dextrin | polyvinyl alcohol and dextrin | acrylic pressure sensitive adhesive | polyvinyl alcohol and dextrin + humectant, e.g. glycerin, propylene glycol |
| Primer | polyvinyl alcohol + silica | none silica | none | none silica |
| Release Coating | none silicone fluorocarbon | none | cationic UV | none |
| Activator Formula | N/A | water water + PG water + glycerin water + alcohol | N/A | N/A |
| Drying | N/A | activator formula controls rate of drying | N/A | very slow drying due to humectant at high concentration |
| Activator Color | N/A | clear colored | N/A | N/A |
| FDA Acceptable | not acceptable | contact acceptable | not acceptable | contact acceptable |
| Relative Cost | moderate | very low | high | very low |
| Bond to Surface (Box or Bag) | low | permanent fiber-tearing bond | permanent fiber-tearing bond surface dependent | permanent wet bond |

TABLE 2

Example Receipt and Label Construction.

| Layer (top to bottom) | PRIOR ART Receipt | Receipt | PRIOR ART Shipping Label | Shipping Label |
|---|---|---|---|---|
| 1 | release coating | release coating | print receptive coating | release coating |
| 2 | thermal print coating | thermal coating | paper | thermal coating |
| 3 | print receptive coating | print receptive coating | primer | paper/plastic |
| 4 | paper | paper or plastic | permanent or removable adhesive | primer |
| 5 | primer | primer | release coating | remoistenable adhesive |
| 6 | repositionable adhesive | remoistenable adhesive | liner paper |  |

Figure 2:
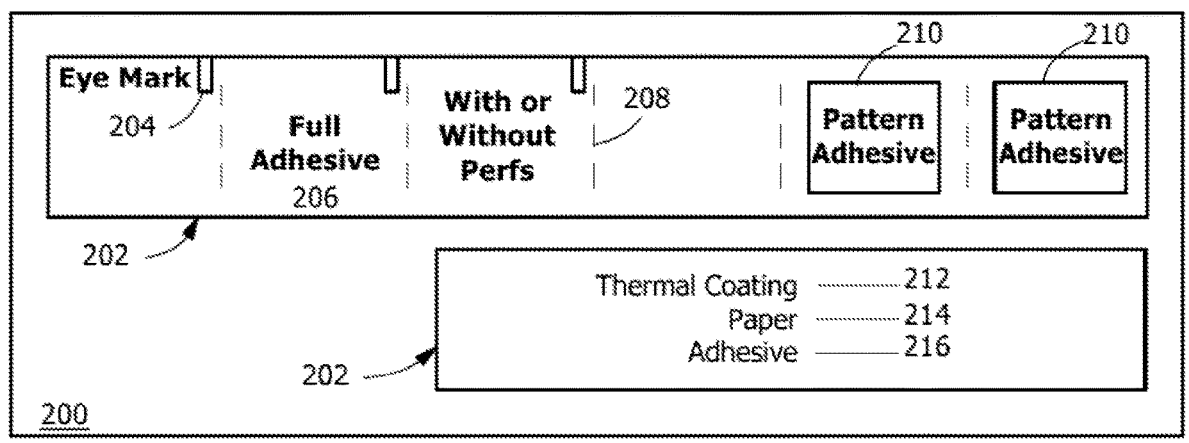
FIG. 2 depicts the construction of an example label in accordance with the systems, devices, and methods disclosed herein.

FIG. 1 depicts the construction of a prior art label, wherein label system 100 includes a plurality of labels 102 each having a label layer 110 and a liner layer 120. Each label layer 110 includes thermal coating 112; paper 114; and adhesive 116. Each liner layer 120 includes silicone coating 122; and base paper 124. FIG. 2 depicts the construction of an example label in accordance with the systems, devices, and methods disclosed herein. Label system 200 includes labels 202 having eye marks 204, full adhesive backing 206 (or patterned adhesive 210) and optional perforations 208. Each label 202 includes thermal coating 212; paper 214; and adhesive 216.

Figure 3:
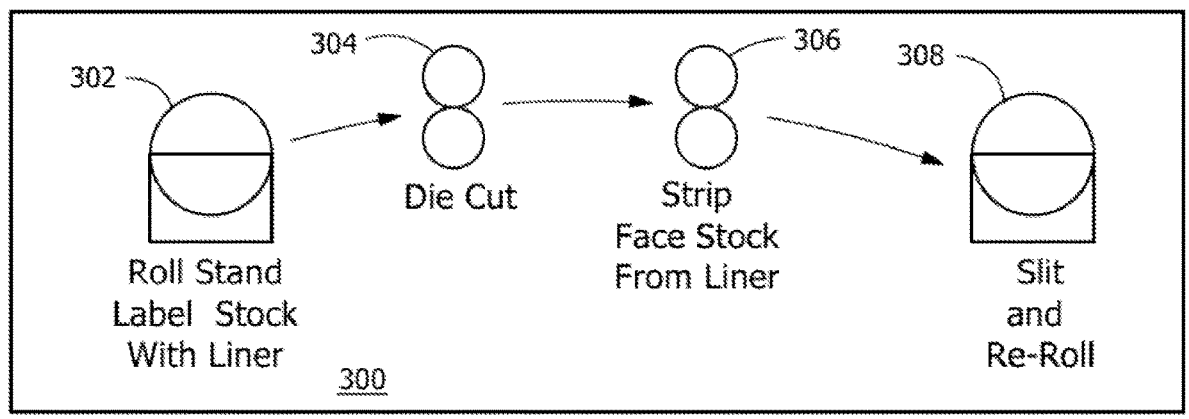
FIG. 3 depicts a prior art method of manufacturing a label.
Figure 4:
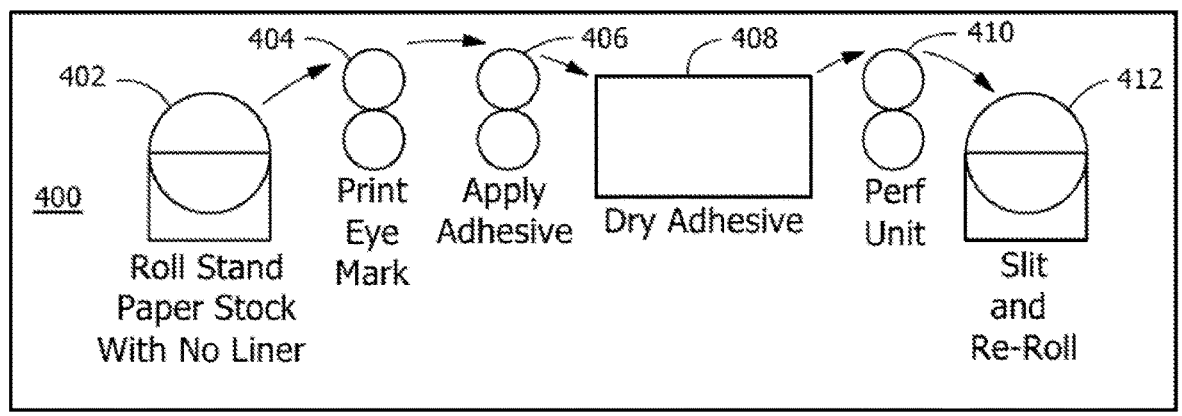
FIG. 4 depicts manufacturing an example label in accordance with the systems, devices, and methods disclosed herein.

FIG. 3 depicts a prior art method of manufacturing a label, wherein labeling system 300 includes providing a roll stand of label stock with liner at 203; die cutting at 304; stripping the face stock from the liner at 306; and slitting and rerolling at 308. FIG. 4 depicts manufacturing an example label in accordance with the systems, devices, and methods disclosed herein, wherein labeling system 400 includes providing a roll stand of paper stock with no liner at 404; printing eye marks at 404; applying adhesive at 406; drying the adhesive at 408; using a perforating unit at 410; and slitting and rerolling at 412.

Figure 5:
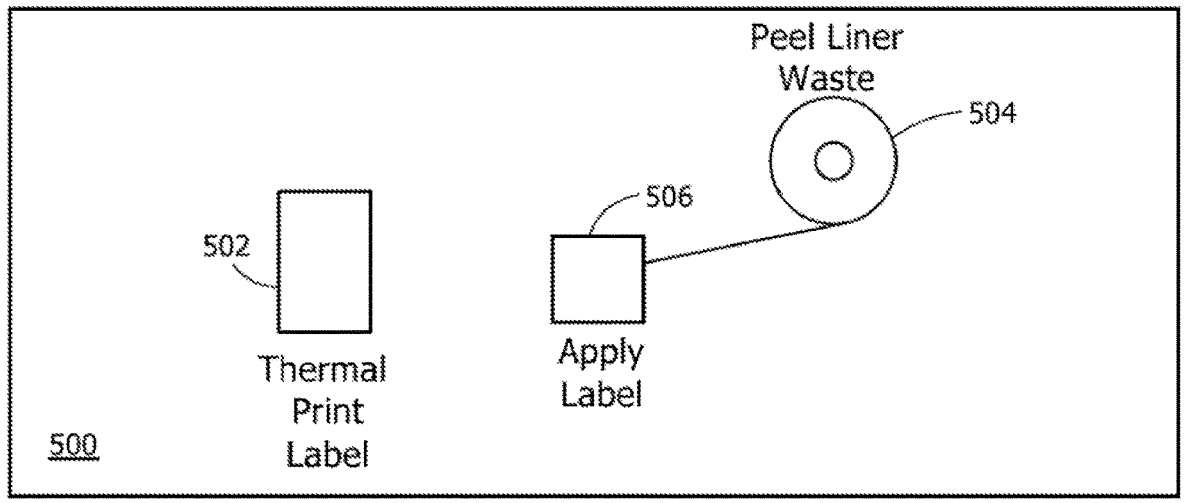
FIG. 5 depicts a prior art method for applying a label.
Figure 6:
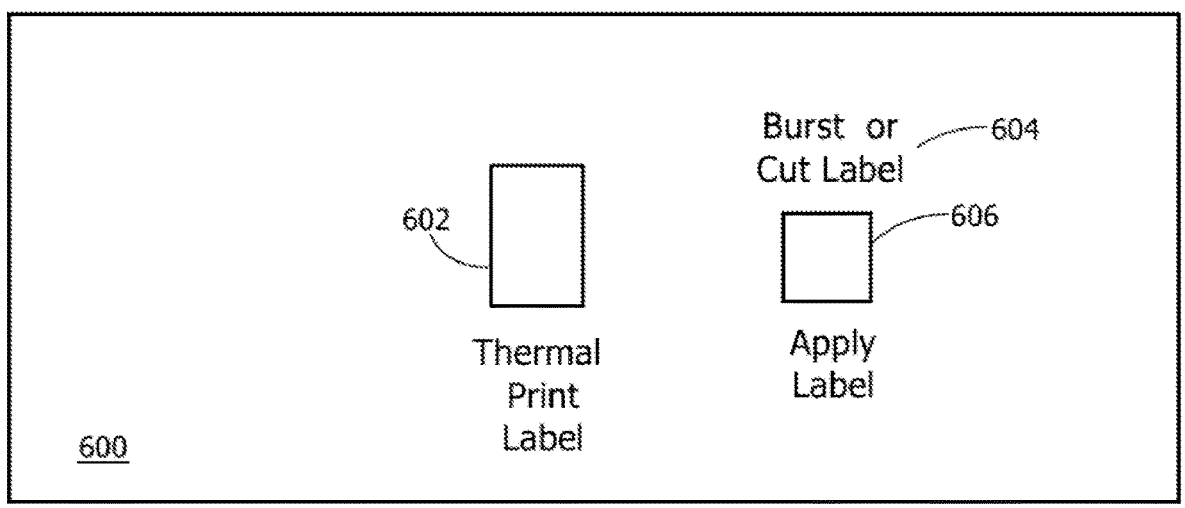
FIG. 6 depicts applying an example label in accordance with the systems, devices, and methods disclosed herein.

FIG. 5 depicts a prior art method for applying a label, wherein system 500 includes providing a thermal print label at 502; removing the liner from the print label at 504; and applying the label at 506. FIG. 6 depicts applying an example label in accordance with the systems, devices, and methods disclosed herein, wherein system 600 includes providing a thermal print label at 602; bursting or cutting the label at 604; and applying the label at 606.

Figure 7:
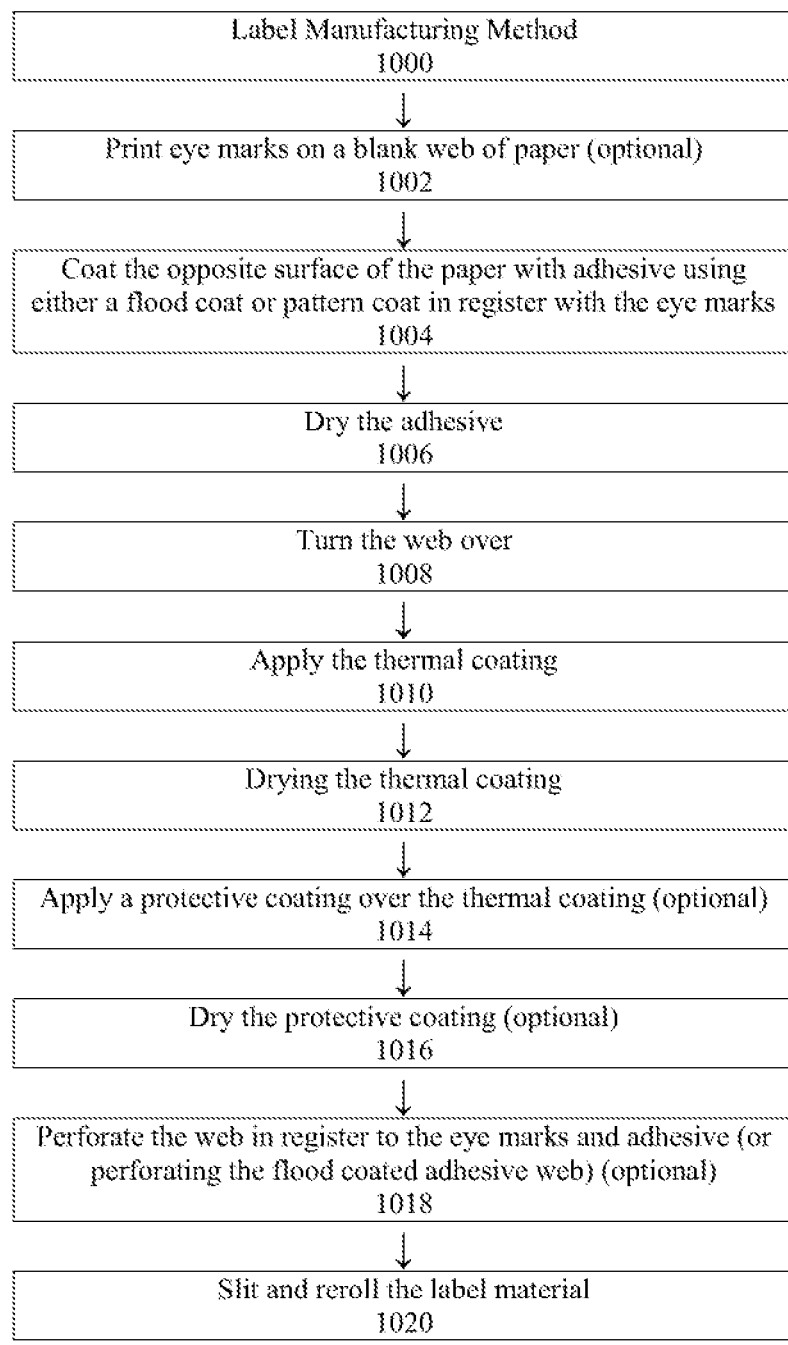
FIG. 7 is a flow chart depicting a first method of manufacturing a label accordance with the systems, devices, and methods disclosed herein.

FIG. 7 is a flow chart depicting a first method of manufacturing a label accordance with the systems, devices, and methods disclosed herein; First example method 1000 for manufacturing the disclosed labels includes printing eye marks on a blank web of paper at step 1002 (optionally); coating the opposite surface of the paper with adhesive using either a flood coat or pattern coat in register with the eye marks at step 1004; drying the adhesive at step 1006; turning the web over at step 1008; applying the thermal coating at step 1010; drying the thermal coating at step 1012; applying a protective coating over the thermal coating at step 1014 (optionally); drying the protective coating at step 1016 (optionally); perforating the web in register to the eye marks and adhesive (or perforating the flood coated adhesive web) at step 1018 (optionally); and slitting and rerolling the label material at step 1020.

Figure 8:
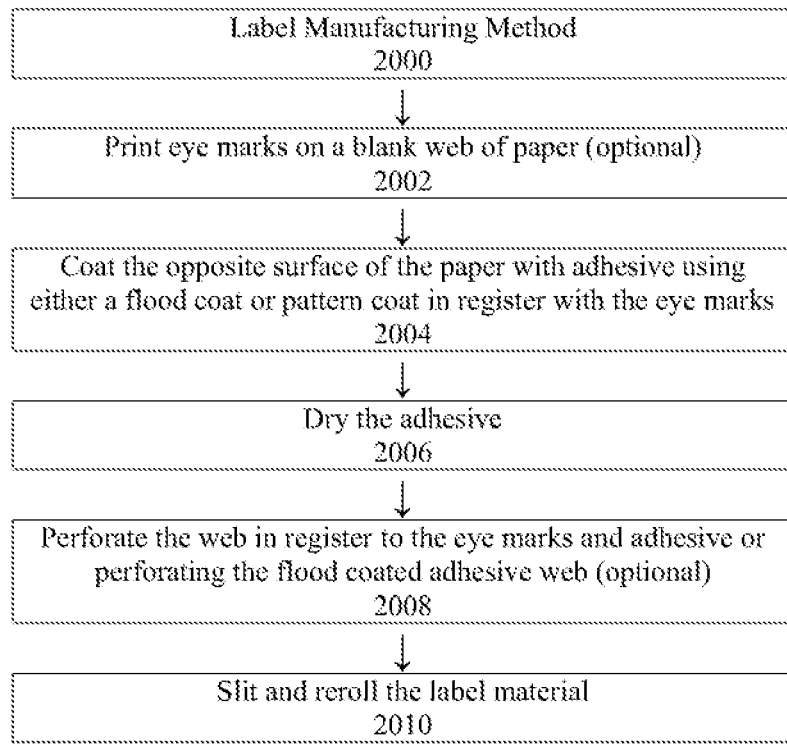
FIG. 8 is a flow chart depicting a second method of manufacturing a label accordance with the systems, devices, and methods disclosed herein.

FIG. 8 is a flow chart depicting a second method of manufacturing a label accordance with the systems, devices, and methods disclosed herein. Second example method 2000 for manufacturing the disclosed labels includes printing eye marks on a blank web of paper at step 2002 (optionally); coating the opposite surface of the paper with adhesive using either a flood coat or pattern coat in register with the eye marks at step 2004; drying the adhesive at step 2006; perforating the web in register to the eye marks and adhesive (or perforating the flood coated adhesive web) at step 2008; and slitting and rerolling the label material at step 2010.

Figure 9:
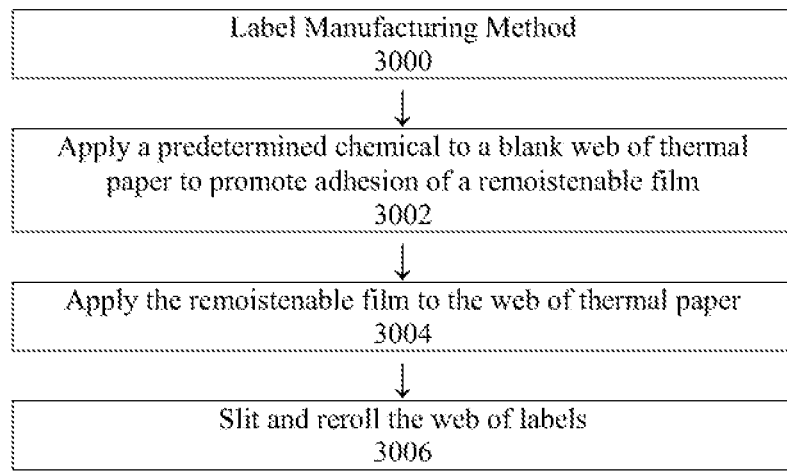
FIG. 9 is a flow chart depicting a third method of manufacturing a label accordance with the systems, devices, and methods disclosed herein.

FIG. 9 is a flow chart depicting a third method of manufacturing a label accordance with the systems, devices, and methods disclosed herein. Third example method 3000 for manufacturing the disclosed labels includes applying a predetermined chemical to a blank web of thermal paper at step 3002 to promote adhesion of a remoistenable film; applying the remoistenable film to the web of thermal paper at step 3004; and slitting and rerolling the web of labels at step 3006.

Advantages of the disclosed remoistenable receipts over existing products used for similar purposes include: (i) an adhesive system that is acceptable from a food regulation perspective; (ii) an adhesive system that creates a permanent bond with packaging; (iii) a receipt that cannot be removed from a package without destroying the package, thereby providing enhanced security; (iv) an adhesive that is not tacky until the adhesive has itself been activated; (v) an adhesive that can be activated by depositing an activator on either the receipt or the package to which the receipt will be attached; and (vi) lower overall cost with regard to the materials and ingredients used to manufacture the remoistenable receipt. Advantages of the disclosed remoistenable labels over existing products used for similar purposes include: (i) reduced materials costs based on eliminating the liner component used in prior art systems; (ii) more labeling material per roll; (iii) reduced shipping costs; (iv) increased efficiency with regard to attaching equipment; and (v) reduced materials waste.

Advantages of applying the disclosed adhesives to the paper web first is that the drying process does not activate the thermal coating. An example paper web has a thickness of 0.002 to 0.016 inches. A preferred thickness for receipts is 0.0035 to 0.005 inches and a preferred thickness for linerless labels is 0.005 to 0.016 inches. Activation of the disclosed remoistenable receipts can occur by activating the receipt or the package to which it is to be adhered. Activation of the disclosed remoistenable labels can occur by activating the label or the package to which it is to be adhered. The drying of the activator can be accelerated or slowed by the addition of predetermined ingredients to the activation solution.

Figure 10:
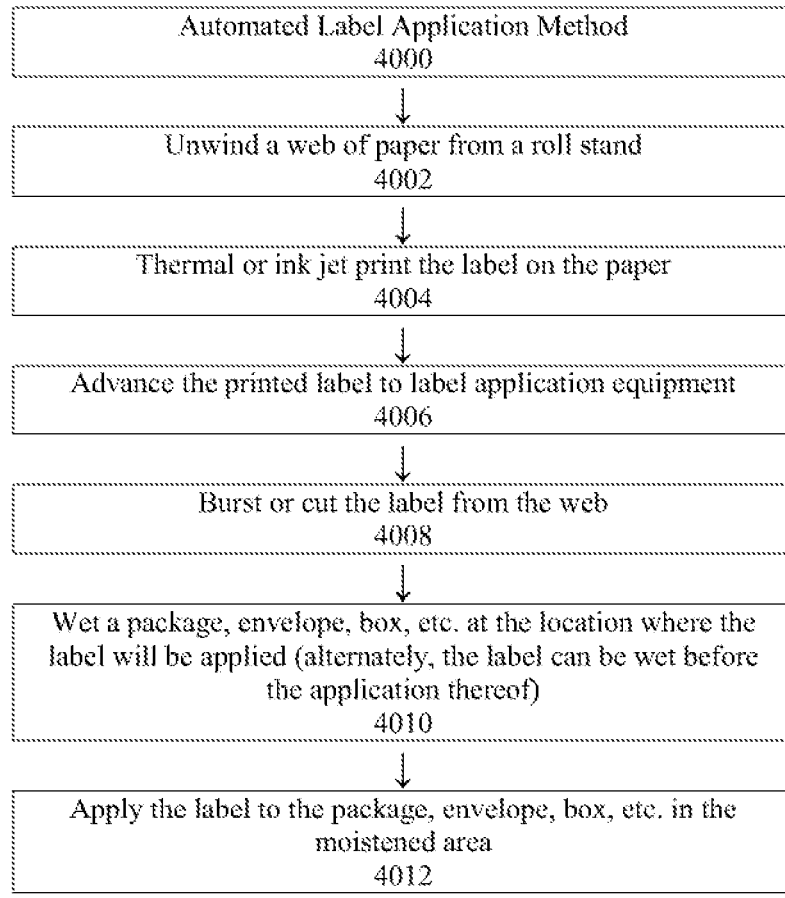
FIG. 10 is a flow chart depicting a first method of applying a label accordance with the systems, devices, and methods disclosed herein.

FIG. 10 is a flow chart depicting a first method of applying a label accordance with the systems, devices, and methods disclosed herein. First example method 4000 for applying the disclosed labels is an automated process for use in, for example, large distribution environments that includes unwinding a web of paper from a roll stand at step 4002; thermal or ink jet printing the label on the paper at step 4004; advancing the printed label to label application equipment at step 4006; bursting or cutting the label from the web at step 4008; wetting a package, envelope, box, etc. at the location where the label will be applied at step 4010 (alternately, the label can be wet before the application thereof); and applying the label to the package, envelope, box, etc. in the moistened area at step 4012. Advantages of this method over existing label application methods include: (i) creation of a lower cost label; (ii) creation of a liner-less label; (iii) creation of a label that is recyclable (label liners are not recyclable); (iv) reduction of waste (previous methods required 0.125 inches of paper between each label); and (v) creation of a label that cannot be removed without damaging or destroying the label itself, thereby conferring greater packaging security.

Figure 11:
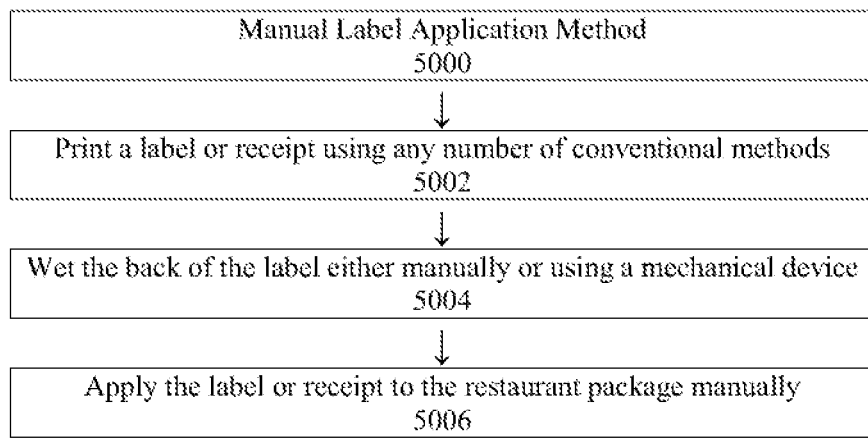
FIG. 11 is a flow chart depicting a second method of applying a label accordance with the systems, devices, and methods disclosed herein.

FIG. 11 is a flow chart depicting a second method of applying a label accordance with the systems, devices, and methods disclosed herein. Second example method 5000 for applying the disclosed labels and receipts is a manual process for use in, for example, fast food environments, that includes printing a label or receipt using any number of conventional methods at step 5002; wetting the back of the label either manually or using a mechanical device at step 5004; and applying the label or receipt to the restaurant package manually at step 5006. Advantages of this method over existing label application methods include: (i) creation of a lower cost label; (ii) providing a security seal for the package, wherein the seal must be damaged or destroyed to be removed; (iii) creation of a receipt that acts as a time stamp for the product contained in the package; and (iv) creation of a label wherein the adhesive will not come off on the inside of a printing machine.

Various implementations of the disclosed receipts and labels may be used in fast food environments wherein a worker receives a food order, processes the food order, prints the receipt or label at the point of purchase, and uses the receipt or label to seal a package or container that stores the food in a tamper-resistant or tamper-proof manner prior to pick-up or delivery. If placed on the receipt or label in advance, the disclosed adhesives will not interfere with the functioning of a printer used to print the receipt or label. The adhesives used with these implementations may be remoistenable adhesives or pressure-sensitive adhesives. The use of pressure-sensitive adhesives may also include the use of a release coating deposited on the package or container. The printed receipt or printed label may be placed partially across, substantially across, or entirely across the opening of the package, which may be a plastic or paper bag, box, or the like, and secured thereto to form a permanent bond across the opening. If appropriate, the label or receipt may be remoistened prior to attachment using mechanical or manual methods. Alternately, the surface of the package to which the receipt or label is to be attached may be pre-moistened by the worker using mechanical or manual methods prior to attaching the receipt or label thereto. Once the receipt or label has been used to close or seal the package in the described manner, the receipt or label cannot be removed with destroying the receipt or label or the package, or both, thereby making any evidence of tampering visually apparent.

Figure 12A:
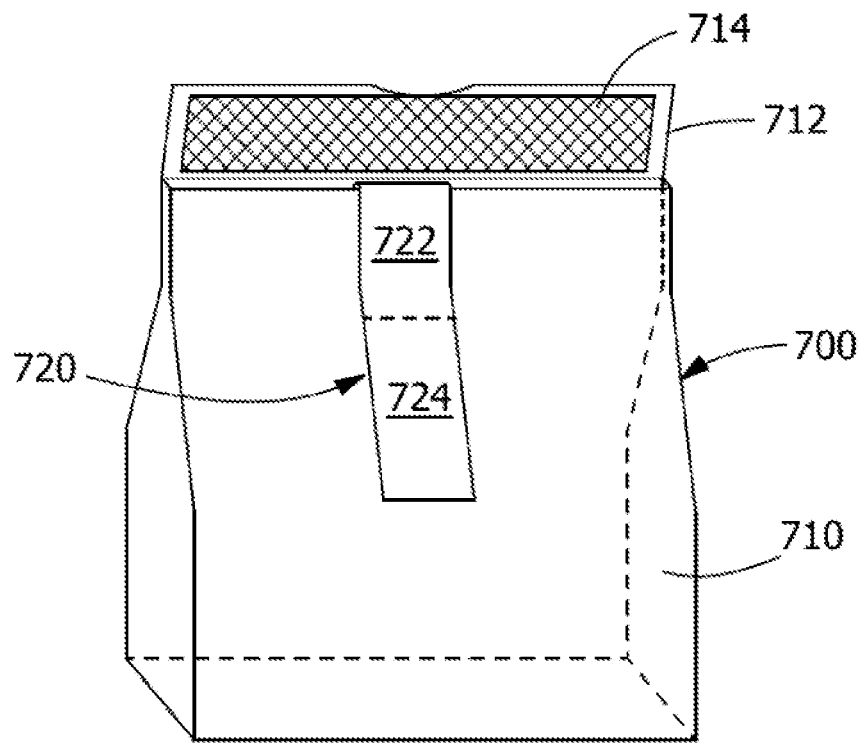
FIG. 12A depicts an implementation of the disclosed label being used as a receipt that seals a bag to which it is attached in a tamper-resistant manner, wherein the permanent adhesive has been deposited on the upper portion of the bag and the upper portion of the bag has not yet been closed to permanently attach the label to the bag.
Figure 12B:
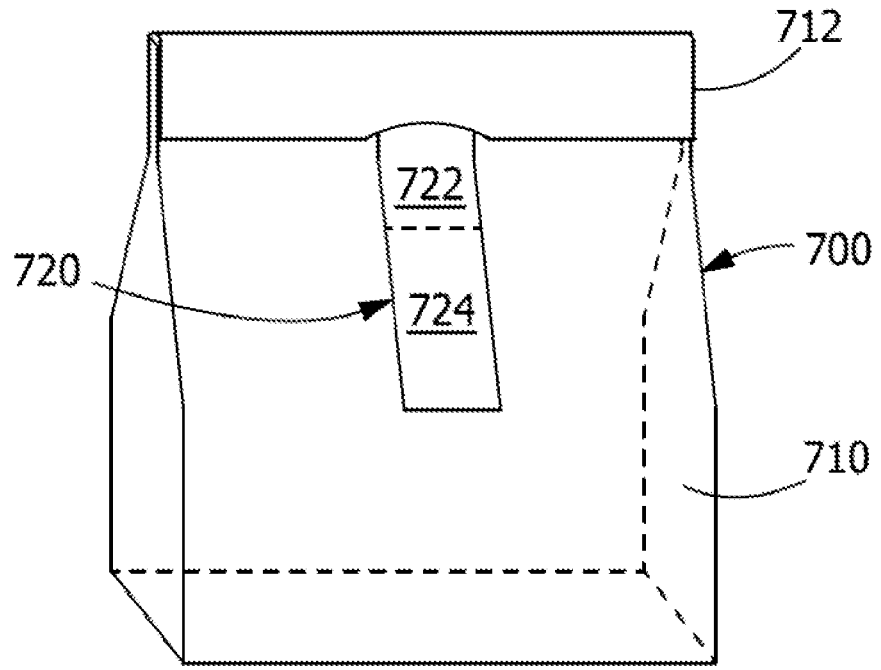
FIG. 12B depicts the implementation of FIG. 12A, wherein the upper portion of the bag has been closed to permanently attach the receipt to the bag.

FIG. 12A depicts an implementation of the disclosed label being used as a receipt that seals a bag to which it is attached in a tamper-resistant manner, wherein a permanent adhesive has been deposited on the upper portion of the bag and the upper portion of the bag has not yet been closed to permanently attach the label to the bag. FIG. 12B depicts the implementation of FIG. 12A, wherein the upper portion of the bag has been closed to permanently attach the receipt to the bag. In FIGS. 12A-12B, bag 700 includes lower portion 710 and upper portion 712, which is essentially a flap onto which adhesive 714 has been deposited. The adhesive may be colored. Receipt 720 is inserted into the opening of bag 700 in a vertical orientation and the flap is closed, thereby sealing the bag in a tamper-resistant manner. Upper portion 722 of receipt 720 remains permanently attached to bag 700 and lower portion 724 may be removed if the customer wishes to retain transactional information and/or information regarding the contents of the bag.

Figure 13:
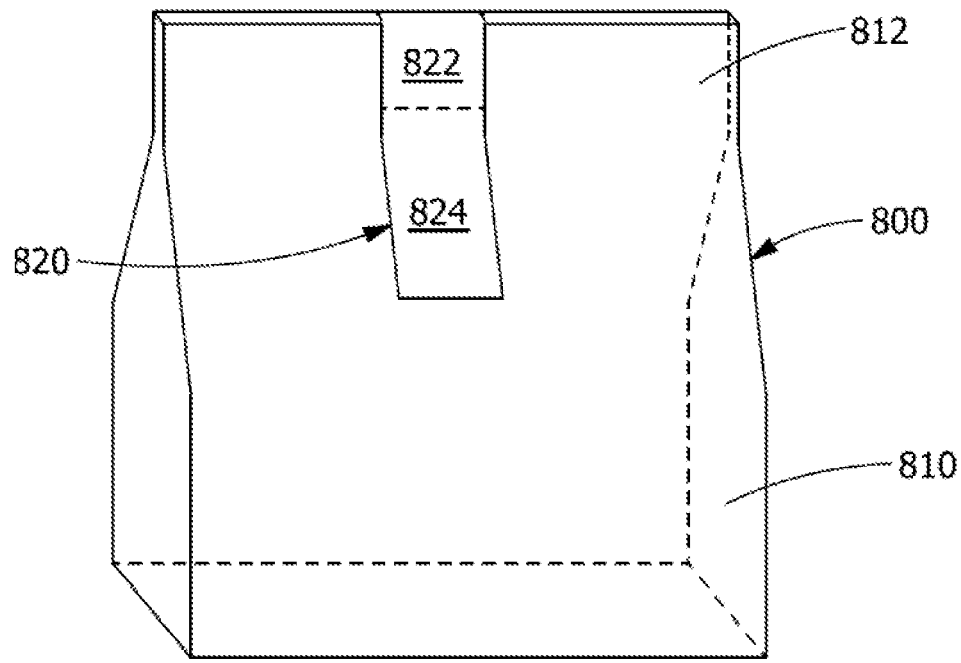
FIG. 13 depicts an implementation of the disclosed label being used as a receipt that seals a bag to which it is attached in a tamper-resistant manner, wherein the permanent adhesive has been deposited on either the receipt or the upper portion of the bag, and wherein the receipt has been attached to the bag in a substantially vertical orientation at the midpoint of the upper portion of the bag.

FIG. 13 depicts an implementation of the disclosed label being used as a receipt that seals a bag to which it is attached in a tamper-resistant manner, wherein the permanent adhesive has been deposited on either the receipt or the upper portion of the bag, and wherein the receipt has been attached to the bag in a substantially vertical orientation at the midpoint of the upper portion of the bag. In FIG. 13, bag 800 includes lower portion 810 and upper portion 812. Label 820 is attached to upper portion 812 in a vertical orientation in a tamper-resistant manner. Upper portion 822 of receipt 820 remains permanently attached to bag 800 and lower portion 824 may be removed if the customer wishes to retain transactional information and/or information regarding the contents of the bag.

Figure 14:
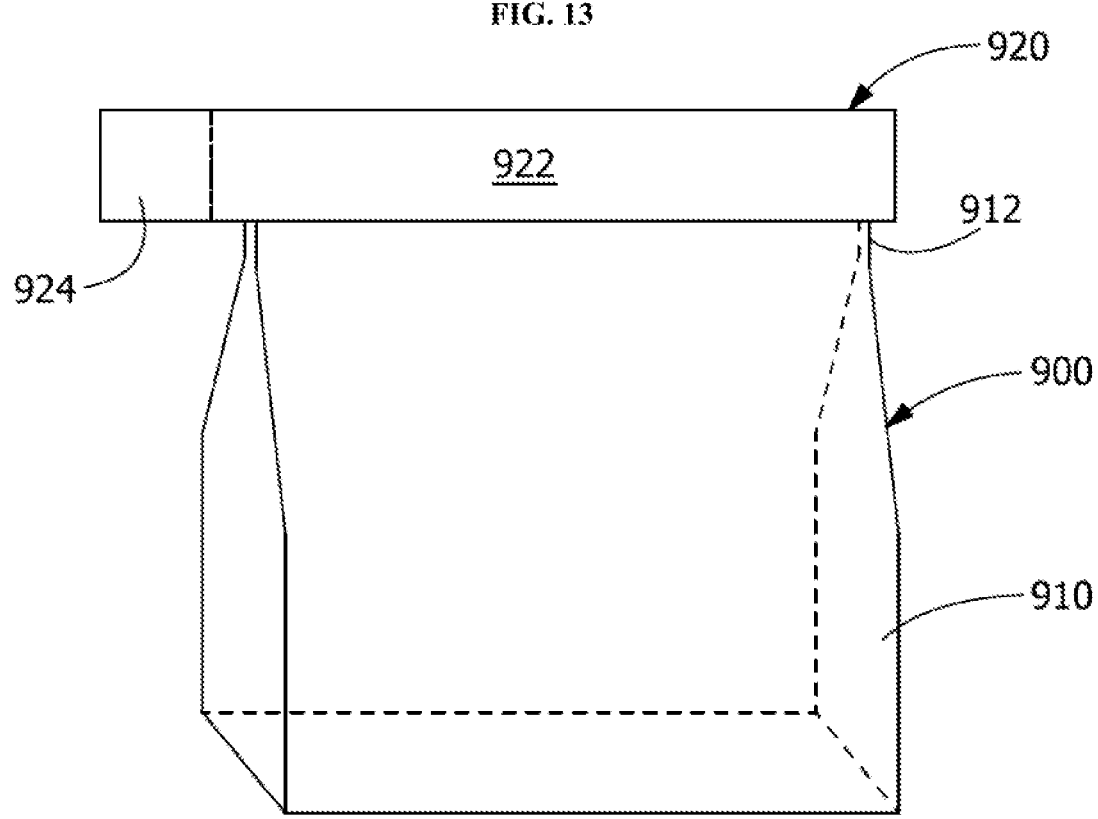
FIG. 14 depicts an implementation of the disclosed label being used as a receipt that seals a bag to which it is attached in a tamper-resistant manner, wherein the permanent adhesive has been deposited on either the receipt or the upper portion of the bag, and wherein the receipt has been attached to the bag in a substantially horizontal orientation along the entire length of the upper portion of the bag.

FIG. 14 depicts an implementation of the disclosed label being used as a receipt that seals a bag to which it is attached in a tamper-resistant manner, wherein the permanent adhesive has been deposited on either the receipt or the upper portion of the bag, and wherein the receipt has been attached to the bag in a substantially horizontal orientation along the entire length of the upper portion of the bag. In FIG. 14, bag 900 includes lower portion 910 and upper portion 912. Label 920 is attached to upper portion 912 in a horizontal orientation in a tamper-resistant manner. Inner portion 922 of receipt 920 remains permanently attached to bag 900 and outer portion 924 may be removed if the customer wishes to retain transactional information and/or information regarding the contents of the bag.

Figure 15:
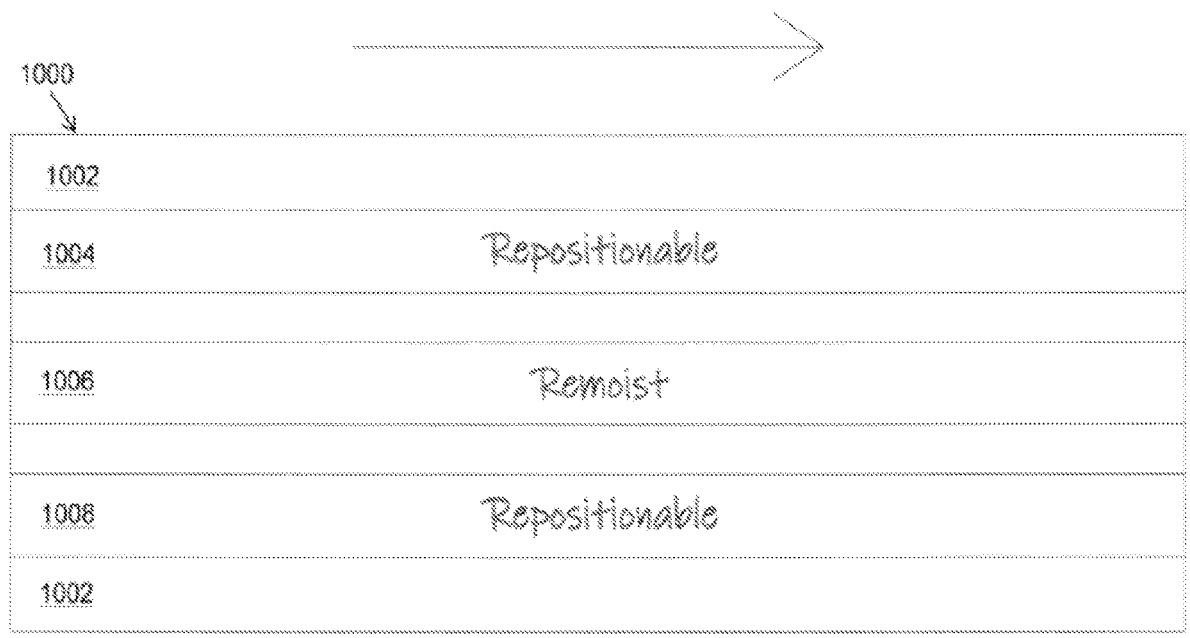
FIG. 15 depicts an implementation of the disclosed label, which may be used as a receipt for sealing a bag or other container, wherein solid strips of both repositionable adhesive and remoistenable adhesive have been deposited on a receipt roll prior to application of the label or receipt to a substrate.

FIG. 15 depicts an implementation of the disclosed label, which may be used as a a receipt for sealing a bag or other container, wherein solid strips of both repositionable adhesive and remoistenable adhesive and been deposited on a receipt roll prior to application of the label or receipt to a substrate. As shown in FIG. 15, receipt 1000 includes uncoated paper or thermal paper 1002 upon which a plurality of (e.g., three) strips of adhesive have been deposited. First strip of adhesive 1004 is a repositionable adhesive, second strip of adhesive 1006 is a remoistenable adhesive such as those disclosed herein, and third strip of adhesive 1008 is a repositionable adhesive. Repositionable strips 1004 and 1008 hold the receipt in place while the remoistenable adhesive dries and creates a permanent bond with the substrate. As will be appreciated by one of ordinary skill in the art, a repositionable adhesive allows a label to be repositioned without damage to either the label or the substrate. Many applications require that the adhesive hold the label firmly in place while not leaving residue behind when the label is removed. Repositionable adhesives are available from many commercial sources and may include a wide variety of ingredients. Repositionable adhesives used on labels are usually made with microsphere adhesives (particularly acrylic-based microsphere adhesives) that have relatively low initial tack and low ultimate adhesion meaning that a label can be removed without damaging the label or the substrate and has enough tack to be reapplied successfully. An example repositionable adhesive is 3991B1 (H. B. Fuller; Simpsonville, SC), which includes acrylic microspheres. An example remoistenable adhesive is A1 BOND 15-755 (A1 Chemical; Claymont, DE), which includes polyvinyl acetate (PVAc) with polyvinyl alcohol (PVOH).

All literature and similar material cited in this application, including, but not limited to, patents, patent applications, articles, books, treatises, and web pages, regardless of the format of such literature and similar materials, are expressly incorporated by reference in their entirety. Should one or more of the incorporated references and similar materials differs from or contradicts this application, including but not limited to defined terms, term usage, described techniques, or the like, this application controls.

As previously stated and as used herein, the singular forms "a," "an," and "the," refer to both the singular as well as plural, unless the context clearly indicates otherwise. The term "comprising" as used herein is synonymous with "including," "containing," or "characterized by," and is inclusive or open-ended and does not exclude additional, unrecited elements or method steps. Although many methods and materials similar or equivalent to those described herein can be used, particular suitable methods and materials are described herein. Unless context indicates otherwise, the recitations of numerical ranges by endpoints include all numbers subsumed within that range. Furthermore, references to "one implementation" are not intended to be interpreted as excluding the existence of additional implementations that also incorporate the recited features. Moreover, unless explicitly stated to the contrary, implementations "comprising" or "having" an element or a plurality of elements having a particular property may include additional elements whether or not they have that property.

The terms "substantially" and "about" used throughout this specification are used to describe and account for small fluctuations, such as due to variations in processing. For example, these terms can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%, and/or 0%.

Underlined and/or italicized headings and subheadings are used for convenience only, do not limit the disclosed subject matter, and are not referred to in connection with the interpretation of the description of the disclosed subject matter. All structural and functional equivalents to the elements of the various implementations described throughout this disclosure that are known or later come to be known to those of ordinary skill in the art are expressly incorporated herein by reference and intended to be encompassed by the disclosed subject matter. Moreover, nothing disclosed herein is intended to be dedicated to the public regardless of whether such disclosure is explicitly recited in the above description.

There may be many alternate ways to implement the disclosed inventive subject matter. Various functions and elements described herein may be partitioned differently from those shown without departing from the scope of the disclosed inventive subject matter. Generic principles defined herein may be applied to other implementations. Different numbers of a given module or unit may be employed, a different type or types of a given module or unit may be employed, a given module or unit may be added, or a given module or unit may be omitted.

It should be appreciated that all combinations of the foregoing concepts and additional concepts discussed in greater detail herein (provided such concepts are not mutually inconsistent) are contemplated as being part of the disclosed inventive subject matter. In particular, all combinations of claimed subject matter appearing at the end of this disclosure are contemplated as being part of the inventive subject matter disclosed herein. While the disclosed inventive subject matter has been illustrated by the description of example implementations, and while the example implementations have been described in certain detail, there is no intention to restrict or in any way limit the scope of the appended claims to such detail. Additional advantages and modifications will readily appear to those skilled in the art. Therefore, the disclosed inventive subject matter in its broader aspects is not limited to any of the specific details, representative devices and methods, and/or illustrative examples shown and described. Accordingly, departures may be made from such details without departing from the spirit or scope of the general inventive concept.

What is claimed:

1. A labeling system for use with containers, comprising:
   (a) at least one linerless label, wherein the at least one linerless label is adapted to receive printing thereon;
   (b) a substrate for receiving the label and to which the label becomes permanently bound after the label has been attached to the substrate;
   (c) a first adhesive, wherein the first adhesive is a repositionable adhesive;
   (d) a second adhesive, wherein the second adhesive is a remoistenable adhesive that includes predetermined amounts of polyvinyl alcohol, dextrin, and at least one humectant, and
   (e) wherein the first and second adhesives are deposited on the label prior to attaching the label to the substrate.

2. The labeling system of claim 1, wherein the at least one linerless label includes thermal paper or standard paper.

3. The labeling system of claim 1, wherein the at least one linerless label is adapted for use as a receipt, and wherein the receipt is adapted to seal a package to which it is attached in a tamper-proof manner by creating a closure that can only be removed by damaging or destroying the package, the receipt, or both the package and the receipt.

4. The labeling system of claim 1, wherein the second adhesive is a food grade material.

5. The labeling system of claim 1, wherein the at least one humectant is glycerin, propylene glycol, or a combination thereof.

6. The labeling system of claim 1, wherein the substrate is a bag or box used for storing and transporting food.

7. The labeling system of claim 1, wherein the label is adapted to be attached to the substrate either manually or in an automated manner.

* * * * *